June 24, 1930.  C. A. MELOY  1,766,664

TIRE LOCK

Filed Feb. 25, 1927

Inventor
Charles A. Meloy
By Lyon & Lyon
Attorneys

Patented June 24, 1930

1,766,664

UNITED STATES PATENT OFFICE

CHARLES A. MELOY, OF SANTA MONICA, CALIFORNIA

TIRE LOCK

Application filed February 25, 1927. Serial No. 170,834.

This invention relates to tire locks, and is more particularly directed to means for locking the casing and tube to the wheels of a motor vehicle.

With the advent of successful tire locks for locking the spare tires and rims to the tire carrier of a motor vehicle and as it is now easier to remove the rim, casing and tube from the wheels of a motor vehicle than it is in many cases to break such locks, thefts of tires, casings, and rims from the wheels of motor vehicles are increasing.

It is, therefore, an object of this invention to provide means for locking the tube, casing, and rim to the wheels of a motor vehicle.

Another object of this invention is to provide means which may be easily mounted in position and easily removed from position for holding and locking the casing, tube, and rim to the wheel of a motor vehicle.

Other objects and advantages of this invention will be apparent from the following detailed description.

In the preferred embodiment of this invention, illustrated in the accompanying drawings, 1 indicates a tire within which a tube 2 is positioned and inflated with air. The tire or casing 1 and tube 2 are mounted upon a rim 3 which is detachably secured to the wheel 4 of a motor vehicle, indicated at 5.

Any suitable form of means may be provided, such as illustrated at 6, for detachably securing the rim 3 to the wheel 4.

Figure 1:
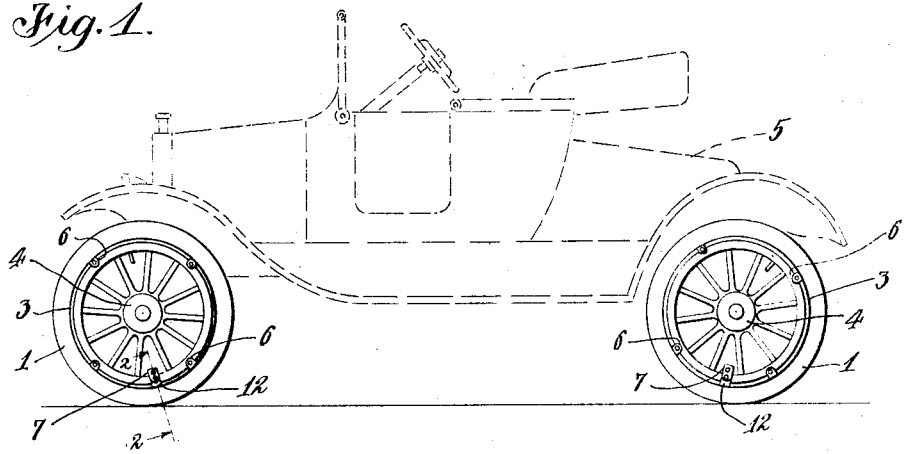
Figure 1 is a side elevation of a motor vehicle shown in dotted lines illustrating the tire locking means embodying this invention as positioned on the wheels thereof.
Figure 2:
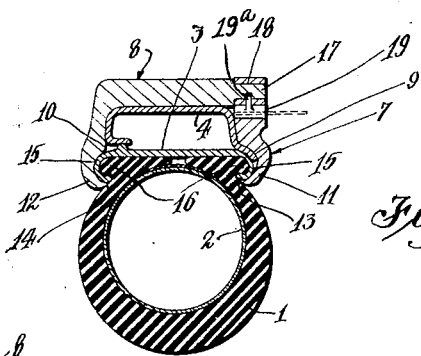
Figure 2 is a section taken substantially on the line 2—2 of Figure 1.
Figure 3:
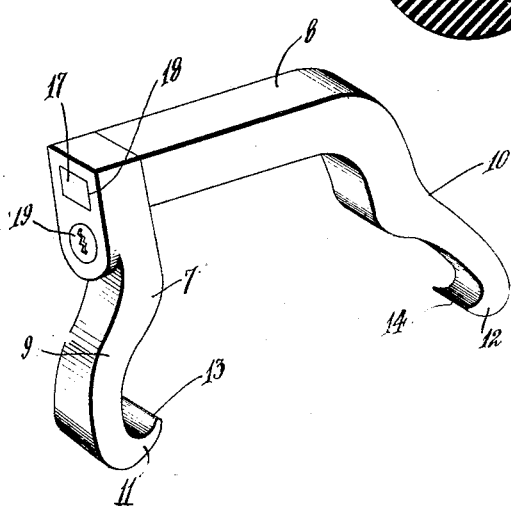
Figure 3 is a perspective view of the tire lock embodying this invention.

The locking means embodying this invention is composed of two members 7 and 8 which are formed curved as illustrated at 9 and 10 to approximate the combined profile of the assembled rim 3 and rim of the wheel 4, as indicated in Figure 2. The members 7 and 8 are formed with hooks 11 and 12 at their lower ends which terminate in blunt edges 13 and 14. The curved sections 11 and 12 of the members 7 and 8 are adapted to engage over the curved flanges 15 of the rim 3 in position to engage and prevent the removal of the beads 16 of the casing 1. The body of the member 8 is in the form a bar, which may be integral with the hook 11.

Means are provided for locking the portions 7 and 8 in position, which means may be of any desired or preferred construction, and are herein illustrated as comprising a square shank or trunnion 17 formed at the end of the body of member 8 which fits within a complementary socket in the form of a square hole 18 formed in the end of the member 7. Any suitable form of barrel locking means, as indicated at 19, may be employed for locking the trunnion 17 within the socket.

Having fully described my invention, it is to be understood that I do not wish to be limited to the exact details herein set forth which may be varied within the scope of my invention as defined by the appended claims.

I claim:

1. In a tire lock for locking a tire on a wheel, the combination of a pair of members adapted to be mounted over the rim of the wheel of a motor vehicle, the said members being formed with hooks at their engaging ends, one of said members having a shank and a key-operated lock having a bolt for engaging the side of said shank to lock the said members together.

2. In a tire lock for locking a tire on a wheel, the combination of a pair of members adapted to be mounted in position over the rim of the wheel, the said members being curved on their inner faces to conform to the combined profile of the wheel rim and demountable rim, the members being formed to provide hooks at their ends adapted to be positioned over the curved flange of the rim to engage the bead of the casing, one of said members having a body in the form of a bar, and the other member having a socket receiving the end of said bar with a key-controlled bolt engaging said bar to lock the members together.

3. In a tire theft lock adapted to locking tires to the wheels of motor vehicles while permitting the wheels of the motor vehicle to rotate without interference, including a pair of members having curved inner faces enabling the same to closely fit the wheel rim, pneumatic tire rim and pneumatic tire assembly and to be mounted in position over the tire rim, one of said members having a shank and the other a socket receiving the same, and means including a bolt at said socket for locking said members together over said wheel rim.

Signed at Los Angeles, California, this 10th day of February, 1927.

CHARLES A. MELOY.